Sept. 16, 1952     E. J. OTTO     2,610,516
SPRING LOADED VARIABLE DIAMETER SHEAVE AND DRIVE
Filed May 14, 1949     3 Sheets-Sheet 1

Inventor
Eugene J. Otto
by William F. Gates
Attorney

Sept. 16, 1952     E. J. OTTO     2,610,516
SPRING LOADED VARIABLE DIAMETER SHEAVE AND DRIVE
Filed May 14, 1949     3 Sheets-Sheet 3
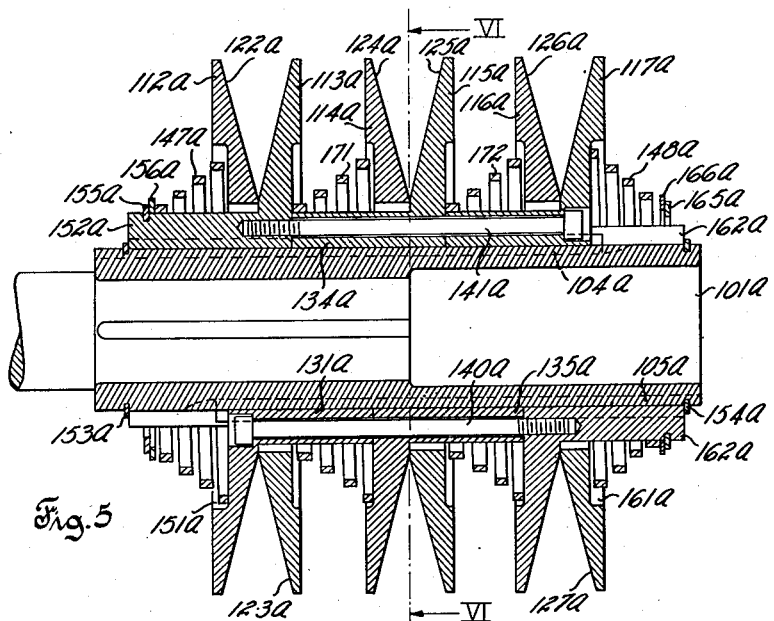
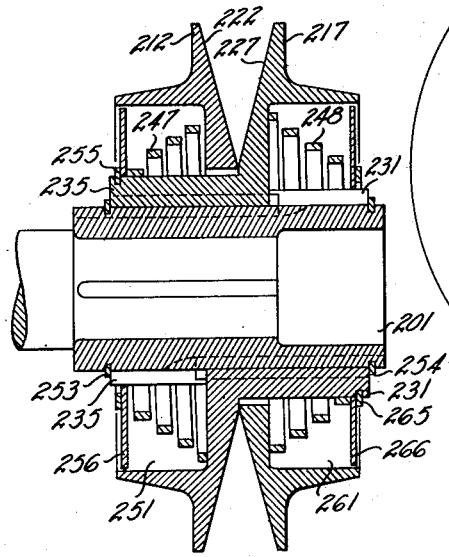
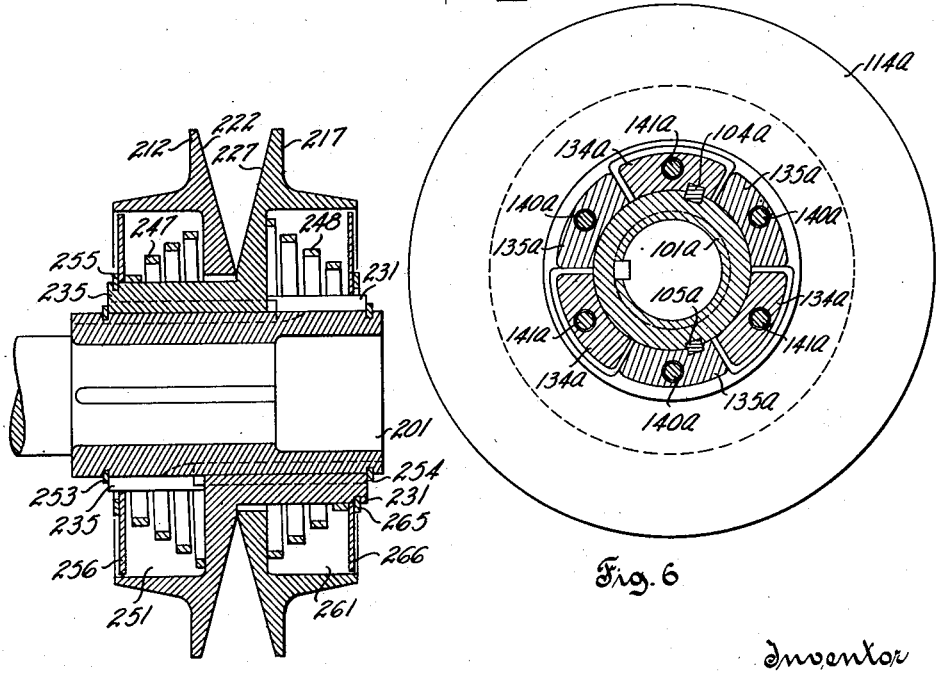

Patented Sept. 16, 1952

2,610,516

UNITED STATES PATENT OFFICE 2,610,516

SPRING LOADED VARIABLE DIAMETER SHEAVE AND DRIVE

Eugene J. Otto, Milwaukee, Wis., assignor to Allis-Chalmers Manufacturing Company, Milwaukee, Wis., a corporation of Delaware Application May 14, 1949, Serial No. 93,229

16 Claims. (Cl. 74—230.17)

This invention relates to improvements in expansible pulleys of the type in which opposed frusto-conical surfaces move axially relative to each other to expand and contract the effective pitch diameter relative to a given edge-driving or V-belt.

More particularly the invention resides in an improvement whereby springs are applied to thrust the frusto-conical belt engaging surfaces mutually toward one another, without interfering with a certain degree of freedom of the frusto-conical faced elements to move axially relative to the driving member with which they are connected, and through which spring means are caused to act equally and oppositely on the opposed frusto-conical surfaced elements.

The nature of the invention is in the provision of a structural arrangement involving pulley flange elements arranged slidably relative to a sleevelike member, each flange element being secured to a tie element which passes slidably through an aperture in another flange element, in such a manner that spring means acting against the rear faces of two different flange elements may, through the tie elements passing through such flange elements, act oppositely on the other of the two flange elements so that the two flange elements are equally pressed in opposite directions by the spring means. The arrangement of the springs to press directly against the rear faces of several pulley flange elements makes possible a compactness and efficiency in design and construction and an effective use of springs which are productive of many advantages which will become apparent from a reading hereof. And other features of construction are combined through the invention to provide for effective protection of the actuating springs without complication of the structure.

The prior art contains disclosures of many forms of movable flange, expansible pulleys, in some of which the flanges are oppositely moved toward one another by springs against the driving belt pressure. However, it is believed that none of the previously known constructions provides for such complete freedom of the flanges relative to the driving shaft, coupled with such effective use of springs in a compact arrangement with perfect equalization of the effect of each spring on the relatively movable flanges.

The invention is described hereinbelow as embodied in several closely related specific constructions, for the purpose of disclosing fully and clearly, to persons skilled in the art, how to make use and construct the same, and the description is illustrated by a drawing in which like reference characters are used to indicate the same or similar parts throughout the several views, and in which:

Fig. 5 is a view similar to Fig. 1 of a third modified form of pulley construction;

Fig. 6 is a cross section taken on line VI—VI of Fig. 5;

Fig. 7 is a view of a single groove pulley embodying the invention, shown in section on a longitudinal plane through the axis of rotation.

Fig. 2 is typical of both Figs. 1 and 3.

Fig. 6 is typical of Figs. 4 and 5, and, to a certain degree, Figs. 7 and 8.

Figures 2, 3:
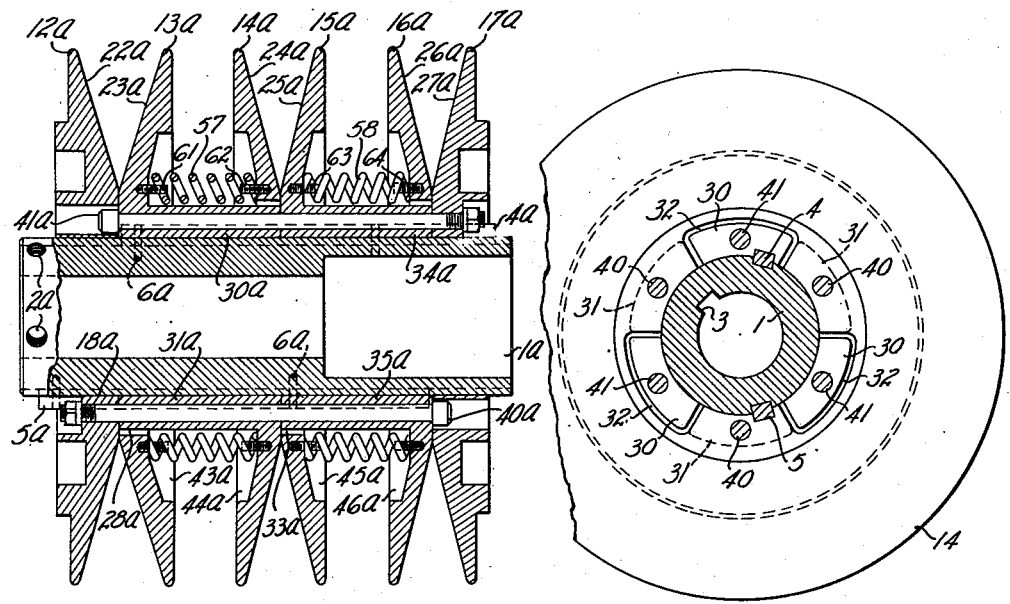
Fig. 2 is a cross section taken on the line II—II of Fig. 1.
Fig. 3 is a view similar to Fig. 1 of a similar pulley with a modified spring arrangement.
Figure 1:
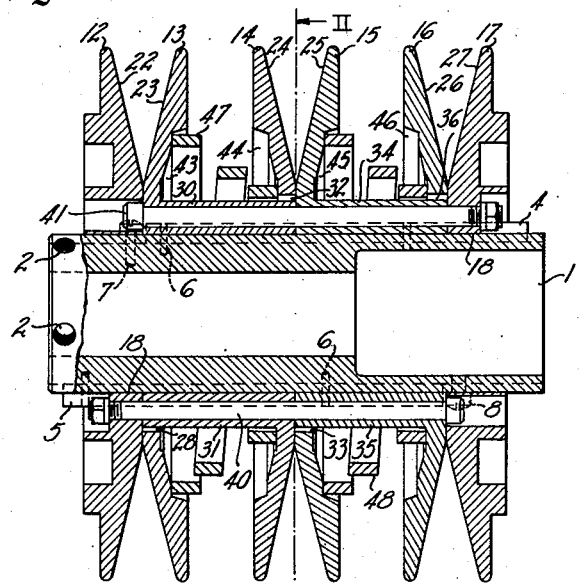
Fig. 1 is a view of a multiple groove pulley embodying the invention, shown in section on a longitudinal plane through the axis of rotation.

The pulley illustrated in Figs. 1 and 2 has a rotary power transmission member 1, preferably in the form of a sleeve, adapted for attachment to the rotary shaft of a machine driving, or driven by, the pulley. The sleeve 1 may be secured to such a shaft (not shown) by set screws in holes shown at 2, and by conventional keying, for which keyway 3 is provided. The external surface of sleeve 1 is cylindrical and provided with two conventional longitudinal keyways, in which keys 4 and 5 are held in fixed axial position as by dowels 6. Stop screws 7 and 8 having their heads protruding radially from the cylindrical external surface of sleeve 1 near opposite ends thereof may also be employed for reasons described hereinbelow.

On the sleeve 1 are mounted a series of flange elements 12, 13, 14, 15, 16 and 17. Flange 12 is termed an end flange and is annular in form with a central opening bounded by a substantially continuous cylindrical bearing surface 18, broken only by a conventional keyway to fit key 5, which extends nearly to the left end of sleeve 1 in Fig. 1. Key 4 terminates short of the left end of sleeve 1 by a substantial distance. The end of key 4 will, since flange 12 has no keyway for it, serve as a stop preventing movement of flange 12 toward the right end of the sleeve, beyond the end of the key 4. Flange 17 is an end flange, preferably a substantial duplicate of flange 12, and is located at the opposite end of sleeve 1, facing oppositely and rotated 180° about the longitudinal axis of the sleeve 1 with relation to flange 12. As flange 12 is stopped by key 4, so flange 17 is stopped axially by key 5. Flanges 12 and 17 have frusto-conical belt engaging faces 22 and 27, respectively, mutually facing each other. Intermediate flange 13 has an annular form, but its central opening forms not a full, but rather an interrupted bearing surface of radius equal to that of the external surface of sleeve 1, parts of the annulus being arcuately cored or routed out as shown at 28, to a larger radius to provide arcuate apertures (three in number in the illustrated form) equally spaced circumferentially of the central opening of the flange. The solid portions of the flange element 13 between these apertures form what may be called arcuate shoes and are extended in an axial direction, rearwardly from the flange proper, as shown at 30, the shoe extensions 30 forming an interrupted ring of circumferentially spaced arcuate lugs serving both as shoes and tie members for a purpose to be more fully described hereinafter. One such shoe or extension 30 is provided with a keyway to fit key 4. The axial extensions 30 are each of lesser arcuate and radial dimensions than the spaces 28. Intermediate flanges 14, 15 and 16 are essentially identical in construction to flange 13, but flanges 14 and 16 face oppositely to flange 13, and are rotated by 180° about the central axis relative thereto, whereas flange 15 faces in the same direction and is axially aligned with flange 13. The axial shoe extensions, or tie members 31 of flange 14 extend between and in the opposite direction axially relative to extensions 30 of flange 13 and penetrate apertures 28 of flange 13, while extensions 30 penetrate the apertures 32 between the shoe extensions 31 of flange 14. The keyway of flange 14 fits key 5. It will be seen that the extensions 34 of flange 15, and 35 of flange 16, likewise extend in opposite directions and penetrate the aligned apertures 36 and 33, respectively. Flanges 13, 14, 15 and 16 have belt engaging faces 23, 24, 25 and 26, respectively.

The faces 22 and 23 of flanges 12 and 13 mutually face each other to cooperate in forming a belt groove, the faces 24 and 25 likewise cooperate to form a second V-belt groove, and faces 26 and 27 form a third belt groove in the pulley illustrated in Fig. 1. Flanges 12, 14 and 16 are united mechanically by bolts 40, the shanks of which pass through suitable holes drilled axially through aligned portions of the three flanges near the sleeve 1. It will be seen that the heads of bolts 40 will seat against the face of flange 16, radially inward of its frusto-conical belt engaging face 26, and the nuts on the opposite ends of bolts 40 will act against the rear face of flange 12, and that the aligned extensions 31 and 35 of flanges 14 and 16 will serve to space the flanges proper so that their frusto-conical faces are maintained in fixed axially spaced relation. The group of flanges 12, 14 and 16 will, however, be axially slidable on sleeve 1, except as limited by stops (key 5). The other group of flanges 13, 15 and 17, are secured in fixed axially spaced relation, in a similar manner by bolts 41. The axial lengths of the shoes, or tie extensions 30, 31, 34 and 35 will be such that the two groups of flanges may move axially relative to each other and to the sleeve 1, through a distance sufficient to provide for a substantial designed change in effective diameter of the belt grooves with respect to a given V-belt width for which the pulley is designed.

The backs of flanges 13, 14, 15 and 16 are annularly recessed as at 43, 44, 45 and 46, and in the annular spaces surrounding the rings of tie extensions 30—31 and 34—35 are located springs or resilient means, 47 and 48 respectively, in the form of spiral coil springs of rectangular wire spring stock capable of being compressed to a minimum length equal to the width of the stock. The recesses 43, 44, 45 and 46 are preferably at least as deep as one-half the spring stock width, so that flanges 13 and 14 may be abutted, back to back, in relative axial motion against the resilient pressure of the springs. It will be seen that the rearward face of each of the flanges 13, 14, 15 and 16 forms a radial abutment acting as a seat for one end of a spring (47, 48).

Where screws 7 and 8 are used as stops, a suitable recess is provided in the bearing surface 18 of flange 12, and another in the corresponding surface of flange 17, to receive the head of the stop screw, as shown in Fig. 1. These screws will serve as limit stops for each of the two flange groups, relative to the sleeve 1.

In operation, the springs 47 and 48 will cooperate equally, and in parallel, in thrusting the mutually facing flanges toward one another so as to enlarge the effective pulley pitch diameter to a maximum. Each spring will, by virtue of the interdigitated tie extensions of the flange groups, act equally and oppositely on each of the relatively movable groups. When the belt pressures between the pulley flange faces exceed the minimum yielding load of the two springs 47 and 48, the cooperating flanges will be forced apart against the biasing springs so as to decrease the effective pitch diameter of the pulley. When the flange groups are forced apart, there will be a limited degree of axial freedom of movement of both the flange groups axially relative to the sleeve 1, so that under all belt tensions above minimum the whole flange assembly will be capable of self alignment with the companion pulley to which the pulley described will be connected by the belts.

The pulley shown in Fig. 3 is similar in most respects to that of Figs. 1 and 2, the only substantial difference being in form of spring arrangement. Accordingly all reference characters are the same except that the letter $a$ is suffixed, and except that different characters are applied to changed elements such as the springs and new elements such as the pins on which the springs are centered. The springs 57 in Fig. 3 are a series of small helical coil springs centered on a circle of pins 61 and 62 set in the rear faces of flanges 13a and 14a, respectively, and springs 58 are a similar series of springs centered by pins 63 and 64 set in the rear faces of flanges 15a and 16a, respectively. The wire size of these springs 57 and 58 may be so chosen with regard to the depth of recesses in the flanges that the fully compressed spring lengths will not exceed twice the recess depth. The action of the pulley will be identical to that of Fig. 2.

In all of the above described constructions it will be noted that it is characteristic that finger-like tie members, such as shoe extensions 30 and 31, positively secured to oppositely facing flanges are extensible through and beyond another such flange and that a spring acts oppositely on the rear surface of one of these flanges and upon an abutment secured to the fingerlike tie members extensible through it, to urge the two flanges equally in opposite directions.

Figure 4:
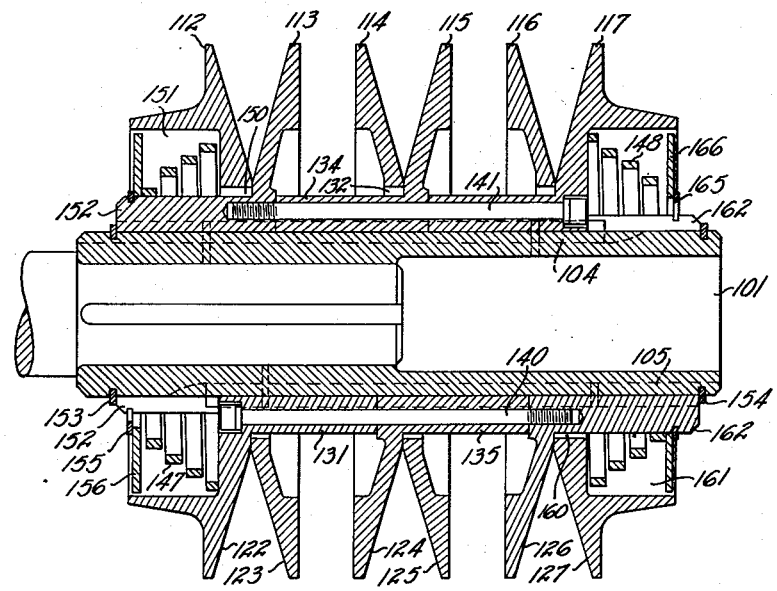
Fig. 4 is a view similar to Fig. 1 of a second modified form of pulley construction.

The pulley illustrated in Fig. 4 is sufficiently different in construction from those of Figs. 1-3 that a different but related system of reference characters has been employed, using figures in the 100 series similar in the last two digits for corresponding parts of different form. Owing to the similarity, the description will be kept brief.

Sleeve 101 of Fig. 4 is a rotary power transmission member which may be secured to a shaft as shown, by a conventional key and set screw arrangement substantially as shown. Keys 104 and 105 serve to guide the assembly of flanges 112, 113, 114, 115, 116 and 117. End flange 112 is connected with the sleeve by an annular series of arcuate shoes and shoe extensions 131 between which are apertures 150. On the rearward side of flange 112 is a recess 151 of considerable axial depth and of annular form. Flange 113 has shoe extensions 152 which extend through apertures 150 of flange 112 and into the recess 151. Flange 114 abuts against the shoe extensions 131 of flange 112 and is positively connected therewith. Shoe extensions 135 are formed integral with flange 114 and extend axially from its front face. Flange 115, of form substantially identical to that of flange 114, has shoe extensions 134 extending axially from its front face through apertures 132 of flange 114 to abut against the rearward side of flange 113 radially inward of its frusto-conical face 123. The construction of flange 116 is identical with that of flange 113 and the construction of flange 117 is identical with that of flange 112. As in the pulleys of Figs. 1-3, the frusto-conical faces 122 and 123; 124 and 125; and 126 and 127, respectively, form V-belt engaging grooves. Flanges 112, 114 and 116 are axially united by screws 140 in fixed axially spaced relation and flanges 113, 115 and 117 are similarly united by screws 141, the two groups being slidable axially on the sleeve 101 relative to the sleeve and to each other. Snap rings 153 and 154 are placed in suitable grooves near the ends of sleeve 101 to prevent axial removal of the flange assemblies from the sleeve. On the ends of the broken annulus formed by the ends of shoe extensions 152 within the recess 151 of flange 112 a snap ring 155 serves to prevent removal of an annular spring seat wall 156 which surrounds the shoe extensions, and between this wall 156 and the end of the recess a spiral coil spring 147 is placed in compression. The outer diameter of the spring seat wall is only slightly less than the diameter of the recess 151 and serves to close its outer end and house in the spring. A similar snap ring 165 and spring seat wall 166 are mounted on the ends of shoe extensions 162 which extend from the face of flange 116 through suitable apertures 160 into the recess 161 of flange 117 and a spring 148 similar to spring 147 acts equally and oppositely on flange 117 and spring seat wall 166, respectively.

It will be clearly understood that the action of springs 147 and 148 in the pulley of Fig. 4 is exactly analogous to that of springs 47 and 48 of Fig. 1. These springs will act equally and in parallel to force the two groups of flanges in opposite directions tending to increase the pitch diameter of the pulley. As in the pulley of Fig. 1 the spring means acts equally and oppositely on axial tie members secured to two differently facing flanges and extending from one of those flanges through the other.

The pulley of Figs. 5 and 6 is so similar to that of Fig. 4 that the same reference characters have been employed for corresponding parts, with the letter $a$ suffixed, so that flange 112a corresponds to flange 112 of Fig. 4 and flange 117a to flange 117 of Fig. 4. Accordingly the description of Fig. 4 can be readily referred to. The only substantial differences are the omission of the deep recesses on the rearward sides of flanges 112a and 117a, as compared with their counterparts in Fig. 4, the addition of two springs 171 between the rearward sides of flanges 113a and 114a and 172 between the rearward sides of flanges 115a and 116a, and the reduction in outer diameter of the spring seat walls 156a and 166a as compared with seat walls 156 and 166, their counterparts in Fig. 4. These added springs 171 and 172 act in parallel with each other and with springs 147a and 148a to urge the pulley toward its maximum pitch diameter setting and to oppose reduction of pitch diameter. By the addition of these springs, pulley spring tension is raised without change in design of flange or spring units.

The pulley of Fig. 7 is a single groove pulley. Reference characters in the 200 series are used which are similar in the last two digits to those of corresponding parts of the pulley of Fig. 4. Its sleeve 201 is similar in practically all but length with sleeve 101 of the pulley of Fig. 4. Its flanges 212 and 217 are similar in most respects to their counterparts 112 and 117 of Fig. 4 except for the omission of holes for bolts 140 and 141 of Fig. 4 which are unnecessary in a single groove pulley, and the provision of suitable grooves on shoe extensions 231 of flange 212 and shoe extensions 235 of flange 217 to accommodate snap rings 255 and 265 which hold spring seat walls 256 and 266 in place on the shoe extensions. As in the pulley of Fig. 4, these spring seat walls or abutments 256 and 266 substantially close the ends of recesses 251 and 261 in the rearward sides of flanges 212 and 217. Springs 247 and 248 obviously operate equally, and in parallel, to urge the frusto-conical faces 222 and 227 toward one another.

Figure 8:
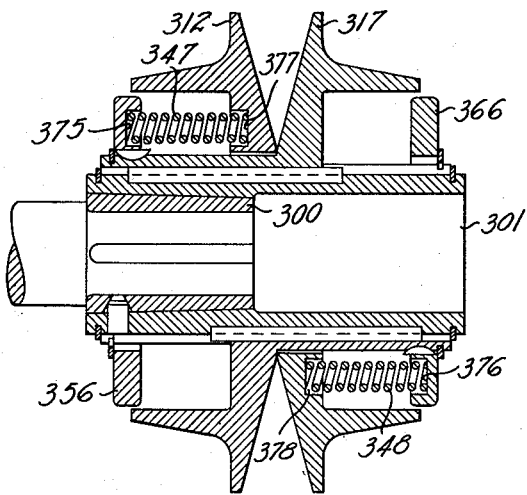
Fig. 8 is a view of a second single groove pulley, similar to Fig. 7, but with a modified spring arrangement.

In the pulley of Fig. 8 there are two variations as compared with the pulley of Fig. 7, namely: (1) the use of rings of coil springs 347 and 348 in place of their counterparts the spiral springs 247 and 248 of Fig. 7, with appropriate modification of the form of spring seat walls 356 and 366, as compared with their counterparts 256 and 266, in Fig. 7, and appropriate modifications in the flanges 312 and 317, as compared with their counterparts 212 and 217 in Fig. 7; and (2) use of a taper bored sleeve 301 and bushing 309 to secure the sleeve 301 to the shaft. It will be seen that suitable spring seat recesses 375 and 376 are provided in seat walls 356 and 366, respectively, and suitable spring seat recesses 377 and 378 in flanges 312 and 317, respectively, are provided to locate the ends of springs 347 and 348, and that conventional keys are employed in the usual manner to prevent rotation of seat walls 356 and 366 relative to the flanges as shown in the drawing. Operation of the pulley of Fig. 8 is analogous to that of all other pulleys described as to the action of the springs on the two flanges 312 and 317 to increase the pitch diameter.

While only single groove and triple groove pulleys are illustrated, because of a desire to keep the disclosure as brief as possible consistent with completeness, it will be clearly understood that pulleys of two or any other number of grooves more than three can be similarly made, merely by changing the number of pairs of intermediate flanges placed between the end flanges, and employing sleeves and tie bolts (or screws) of sufficient length.

In all constructions in accordance with the invention it will be preferable to make all shoe extensions or tie members sufficiently long to permit a certain designed relative axial movement of cooperating flanges. It will also be desirable to make the axial depths of recesses 151 and 161 etc. sufficient to equal the desired axial freedom of motion of the sheave groups plus the minimum length of the spring in order that the springs in such recesses may remain housed within the recesses throughout the full range of motion of the relatively movable groups of flanges. Where, as in the pulleys of Figs. 1, 3 and 5, springs are carried between two rearwardly opposed flanges, it will be preferable to make the recesses in which the springs are seated at least as deep axially as half the fully compressed or minimum compressed length of the springs used so that the adjacent, oppositely facing flanges may be fully backed up against one another in the minimum pitch diameter position.

The term "tie means" or "tie member" as used in this specification and the appended claims shall include all forms of positive mechanical connection, whether of the compression or tension types. What is illustrated is, of course, a species of lug or strut, or a series of spacing struts or lugs in alignment and held together by a tie bolt, but obviously there are other generally equivalent mechanical devices for rigidly spacing flanges and for connecting spring abutments on one side of a first flange, with a second flange on the other side of the first. Several known variants are shown in patents to Jannin U. S. 2,031,712 and Otto et al. U. S. 2,262,197.

The particular embodiments illustrated and described herein are illustrative only, and the invention includes such other modifications and equivalents as may readily occur to others skilled in the art, within the scope of the appended claims.

It is claimed and desired to secure by Letters Patent:

1. In a variable pitch diameter pulley of the type described, a rotary power transmission member having a generally cylindrical external surface; a pair of frusto-conical faced, annular flange elements mounted on said member in slidably contacting relation with respect to said cylindrical external surface so as to be axially movable with respect to said member and each other, said elements being mounted in oppositely facing relation; a plurality of rigid tie means positively connected with and extending axially from each said annular flange element, parallel with the axis of said member and circumferentially spaced thereabout, the said rigid tie means of each said flange element passing between those of the other said element and through and beyond said other element in axially movable relation thereto; and spring means in the annular space to the rear of at least one said flange element and surrounding said tie means of the other said element of said pair, said spring means being operatively connected at one end with said one of said flange elements and at its other end with said tie means extending therethrough to resiliently urge said flange elements in opposite directions axially relative to each other.

2. In a variable pitch diameter pulley of the type described, a rotary power transmission member having a generally cylindrical surface; a pair of frusto-conical faced annular flange elements mounted on said member in coaxial relation and in slidably contacting relation with respect to said cylindrical surface so as to be axially slidable thereon in opposite directions; a series of rigid arcuate lugs positively connected with and extending axially from each of said elements, said lugs being circumferentially spaced about the external surface of said member; each said flange element having arcuate apertures in the spaces between said lugs to accommodate the lugs connected with the other said flange element, in mutually interpenetrating relation; and spring means carried by said flange elements and lugs in the annular space to the rear of at least one of said flange elements and surrounding the lugs connected with the other of said flange elements, said spring means being connected at its opposite ends to and resiliently urging said flange element and the lugs penetrating the same in opposite directions, axially of said member.

3. An expansible pulley of the type described, comprising: a rotary power transmission member; first and second elements each having a frusto-conical, belt engaging face and an aperture extending therethrough in an axial direction; means connecting each of said elements in coaxial, slidably contacting, nonrotatable relation with respect to said member, in mutually facing relation; first and second tie means, rigidly connected with said first and second elements, respectively, and extending axially, in relatively movable relation, through the aperture of the other said element; and first and second spring means, operatively connected with said first and second tie means, respectively, for resiliently connecting first tie means with said second element and for resiliently connecting said second tie means with said first element, said spring means being carried solely by said tie means and said elements so as to be free of any mechanical connection with said member.

4. An expansible pulley of the type described, comprising: a rotary power transmission member having an external surface with portions substantially parallel to the axis of rotation; first and second elements each having a frusto-conical belt engaging face, and an aperture formed to fit said portions of said external surface of said member in axially movable, slidably contacting relation in a manner to locate said frusto-conical face in coaxial relation to said axis of rotation; at least one tie means positively connected with and extending axially from each of said first and second elements, respectively, in the direction of its frusto-conical face and penetrating the other said element; first and second resilient, compressible spring means located to the rear of said first and second elements, respectively; and means operatively connecting said first and second spring means in axially compressible relation between said first element and said tie means of said second elements, and between said second element and the tie means of said first element, respectively, in a manner to resiliently urge the said frusto-conical faces of said elements in a direction toward one another.

5. In an expansible pulley of the type described, the combination comprising: a sleevelike rotary power transmission member; a first annular element having a frusto-conical belt engaging face and a plurality of arcuate shoe means circumferentially spaced and rigidly secured to the inner periphery of said element, and projecting axially in advance of said face; a second annular element with shoe means, similar to said first element; said elements being mounted on said member in mutually facing relation with said shoe means engaging said member in axially slidable nonrotatable relation to locate said elements in coaxial surrounding relation to said member with said shoe means of each said element extending axially through the spaces between the shoe means of the other said element, in axially movable relation; abutment means rigidly connected with at least one said shoe means at a point axially well in advance of the frusto-conical face of the annular element to which it is secured; and spring means operatively engaging said abutment means and the relatively movable one of said elements and urging said abutment means rearwardly with respect to said relatively movable element, thereby urging the frusto-conical faces of said first and second elements in mutually approaching direction.

6. A multiple groove expansible pulley of the type described, comprising a sleevelike rotary member; at least four frusto-conical faced, annular, belt engaging elements each mounted in axially slidable, nonrotatable relation on said member, in at least two pairs of mutually facing elements, said elements having apertures extending axially therethrough; tie means connecting the similarly facing elements of successive pairs in rigidly spaced relation and extending in axially movable relation through the apertures of the alternate elements, thereby connecting the elements in two relatively movable groups; a first spring means carried solely by said elements and tie means to the rear of one said element and resiliently connecting said one element to the tie member extending therethrough in a manner to resiliently urge said tie member rearwardly relative to said one element; and a second spring means carried solely by said elements and tie means to the rear of another one of said elements and resiliently connecting said other element to the tie means extending therethrough in a manner to urge said relatively movable tie means rearwardly relative to said other member, said spring means thereby operating in parallel on the oppositely movable groups.

7. In an expansible pulley of the type described: a sleevelike hub member; at least one pair of mutually facing frusto-conical faced, annular, belt engaging elements mounted on said hub member, each provided with a circumferentially spaced series of arcuate shoe means radially inward of its frusto-conical face, said shoe means forming an interrupted, hub-member engaging ring, bored coaxially with said frusto-conical face to fit the external surface of said hub member in axially movable, slidably contacting relation; said shoe means being rigidly attached to said elements of said pair and formed to fit in relatively slidable relation in the arcuate spaces between the shoe means of the other element of said pair and to extend a substantial distance axially beyond and rearwardly relative to said other element of said pair, the said shoe means of each said element of said pair forming an interrupted ring of substantial axial length in the rear of the other said element; an abutment positively connected with the shoe means of each said element of said pair, the abutment of each said ring of shoe means being spaced by a substantial axial distance to the rear of the other element of said pair; and a pair of spring means individually located in the annular spaces surrounding said rings of shoe means, said spring means being individually operatively connected with said abutments at one end and individually, resiliently connecting said abutments with the relatively movable one of said elements to resiliently urge said abutments rearwardly with respect to said relatively movable one of said elements, whereby said spring means act in parallel to yieldably urge the frusto-conical faces of said elements of said pair toward each other.

8. In an expansible pulley of the type described, a sleevelike hub member; at least two pairs of frusto-conical faced, annular, belt engaging elements mounted on said hub member, each provided with a series of circumferentially spaced arcuate shoe means radially inward of its frusto-conical face, said shoe means forming an interrupted, hub-member engaging ring, bored coaxially with said frusto-conical face to fit the external surface of said hub member in axially slidable relation; said arcuate shoe means being formed to fit in relatively slidable relation in the arcuate spaces between the shoe means of an adjacent said element, said shoe means rigidly connecting all elements which face in one direction in one group, and all elements facing in the other direction in another group movable axially as a unit relative to said first named group, the frusto-conical face of each element in each group facing that of an element of the other group and said shoe means being sufficiently long to provide for substantial axial movement of one group relative to the other; and spring means carried solely by said elements and their shoe means and each operatively engaging the rearward surface of at least one said element and being operatively connected with an element of another group by a said shoe means to resiliently urge said relatively movable groups equally in opposite directions relative to each other, independently of any connection with said hub member, in a manner to urge mutually facing elements toward one another.

9. In the device of claim 8, the combination being characterized by aligned recesses formed in the rearward sides of at least two adjacent said elements of different groups in back to back relation, said spring means being a compression spring in compression having a minimum compressed length not greater than the sums of the axial depths of said recesses and seated at opposite ends in said recesses in the space radially outward of said rings of shoe means and between the backs of said elements.

10. The device of claim 3 in which each of said first and second elements has, in its rearward side, a cylindrico-annular recess of depth, axially, at least equivalent to the sum of the minimum axial length of a said spring means and the maximum desired relative axial motion of said elements, into which said tie means, respectively, are extendable; and in which annular spring abutment walls having an external diameter substantially equivalent to the outer diameters of said recesses are positively secured to said tie means within said recesses; said spring means being compression springs, held in compression axially and substantially enclosed within said recessses by said abutment walls.

11. The device of claim 4 in which each of said first and second elements has, in its rearward side, a cylindrico-annular recess of depth, axially, at least equivalent to the sum of the minimum axial length of a said spring means and the maximum desired relative axial motion of said elements, into which said tie means, respectively, are extendable; and in which annular spring abutment walls having an external diameter substantially equivalent to the outer diameter of said recesses are operatively secured to said tie means within said recesses; said spring means being compression springs, held in compression axially and substantially enclosed within said recesses by said abutment walls.

12. The device of claim 5 in which said abutment means is an annular spring seat forming wall; a cylindrico-annular recess being provided in the rearward side of one of said elements adjacent said abutment, of outer diameter substantially equal to said spring seat wall, and of axial depth at least equal to the maximum desired amount of relative axial movement between said elements; and in which said spring means is a compression spring, in compression between and substantially enclosed by said abutment and the walls of said recess.

13. The device of claim 6 in which said one and said other element to the rearward of which are located said first and second spring elements, respectively, are each formed with a cylindrico-annular recess of axial depth at least equivalent to the desired relative axial motion between said two groups; in which an annular spring retaining wall is positively connected with said tie means within each of said recesses; and in which said spring means are compression springs enclosed and compressible within said recesses by said annular spring retaining walls.

14. The device of claim 7 in which each said element of said pair has a cylindrico-annular recess formed in its rearward side, of axial depth at least equal to the desired relative axial movement between said elements; and in which said abutments constitute annular spring retaining walls of external diameter substantially equal to that of said recesses and enclosing and compressing said spring means within said recesses.

15. In a variable pitch diameter pulley of the type described, a rotary power transmission member of generally cylindrical external configuration, a pair of annular end flange elements each having a frusto-conical end face and a substantially complete cylindrical bearing surface mounted in coaxial axially slidable relation on said member, said end flange elements having their frusto-conical faces in mutually facing relation, at least one pair of intermediate annular frusto-conical faced flange elements mounted in back to back relation to each other and in coaxial axially slidable relation to said member and each other between said end flange elements; each of said intermediate flange elements having a central bearing opening fitting said member in axially slidable relation and at least one axially extending aperture therethrough radially outward of said central bearing opening; at least one rigid tie member positively secured to and extending rearwardly from each of said intermediate flange elements, through the aperture of the other said intermediate element and extensible therebeyond, said tie elements being connected in axially fixed relation to said end flange elements, respectively, to fix their respective intermediate flange elements in axial position relative to similarly facing end flange elements; and axially resilient spring means carried by said intermediate flange elements in the annular space between their back surfaces and surrounding said tie means, said spring means being compressed between said back surfaces and acting equally and oppositely thereon to resiliently urge said intermediate flange elements axially apart and said end flange elements axially toward one another.

16. The device of claim 15, in which each of said intermediate flanges has in its rearward surface an annular recess of axial depth equal to at least half the minimum fully compressed axial length of said spring means, said spring means being seated in said recesses.

EUGENE J. OTTO.

REFERENCES CITED

The following references are of record in the file of this patent:

UNITED STATES PATENTS

| Number | Name | Date |
|---|---|---|
| 1,983,132 | Ives | Dec. 4, 1934 |
| 2,117,485 | Lewellen | May 17, 1938 |
| 2,150,456 | Perrine | Mar. 14, 1939 |
| 2,152,207 | Needham | Mar. 28, 1939 |
| 2,168,835 | Wells | Aug. 8, 1939 |
| 2,185,411 | Lewellen | Jan. 2, 1940 |
| 2,289,573 | Almen | July 14, 1942 |
| 2,475,954 | Gerbing | July 12, 1949 |
| 2,532,124 | Shaw | Nov. 28, 1950 |

FOREIGN PATENTS

| Number | Country | Date |
|---|---|---|
| 462,625 | Great Britain | Mar. 12, 1937 |